March 22, 1960 W. M. LEWIS ET AL 2,929,617
AXLE AND BRACKET STRUCTURE
Filed Dec. 26, 1956

INVENTORS.
WILLIAM M. LEWIS
LOUIS M. GRAY
BY
J. Frederick Bechtel
ATTY.

United States Patent Office 2,929,617
Patented Mar. 22, 1960

2,929,617

AXLE AND BRACKET STRUCTURE

William M. Lewis, Orange, Calif., and Louis M. Gray, Buchanan, Mich., assignors to Clark Equipment Company, a corporation of Michigan Application December 26, 1956, Serial No. 630,539

1 Claim. (Cl. 267—2)

This invention relates to the attaching of brackets to axles and axle housings, and more particularly to structures for attaching such brackets to cylindrical and other similarly shaped axles and housings.

It has been customary to attach by welding spring brackets and other brackets which must be attached to axles and axle housings. Other arrangements also have been used, but all arrangements of which we are aware have disadvantages such as difficulty in locating the bracket accurately on the axle, maintaining the proper position of the bracket during the attaching operation, and maintaining the bracket securely and accurately in position subsequently during use of the axle.

The object of the present invention is to provide a means for attaching a bracket to a cylindrical or other similarly curved axle housing which results in accurate positioning of the bracket both longitudinally of the axle housing and circumferentially around it.

A more specific object of the invention is to provide a bracket attaching construction which is inexpensive and easy to employ, but which holds the bracket securely in the desired position during attachment and later during use of the axle.

In carrying out our invention in one form, we provide a cylindrical trailer axle with a circular recess in the outer surface. The bracket which is to be connected to the axle has a recess of the same diameter, and the bracket is located on the axle with the recesses in register and a metal sphere occupying portions of both recesses.

Figure 1:
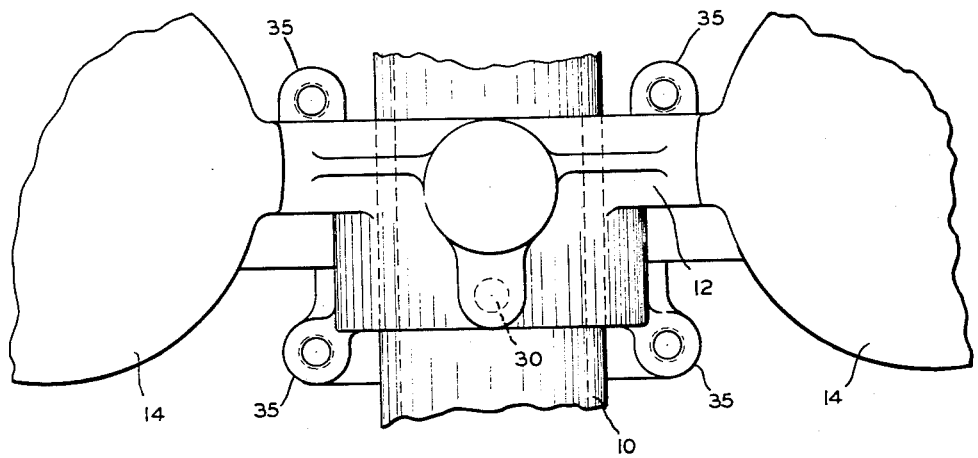
Figure 2:
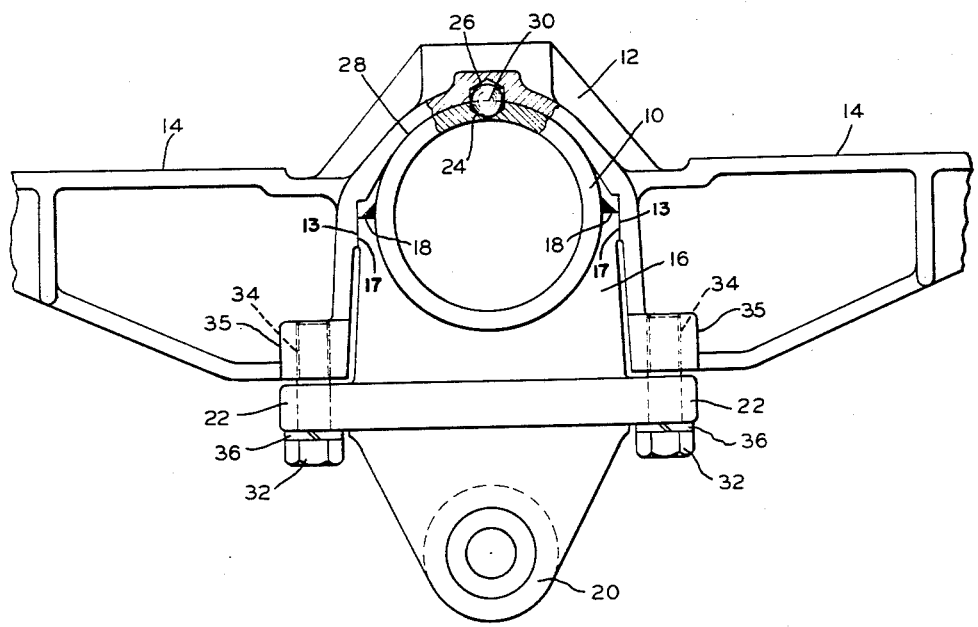

For a clearer and more complete understanding of our invention reference should be had to the accompanying drawing in which Figure 1 is a partial top plan view of an axle and bracket embodying the present invention in a preferred form, and Figure 2 is a side elevational view of the same axle and bracket, with portions broken away to illustrate clearly the construction of this invention.

Referring to the drawing, we have indicated by the numeral 10 an axle which may be, for example, the axle of a trailer. The present invention is employed in securing to this axle a bracket which is indicated generally by the numeral 12. The bracket 12 has flat horizontal upper surfaces 14 on either side of the axle which in this typical case are employed to support air springs (not shown) which in turn support the body of the trailer.

Depending from the axle 10 is another bracket 16 which embraces the axle 10 and is secured to and made integral with it in a suitable manner such as by welding at locations 18 on either side of the axle. Bracket portion 16 has a pair of vertically disposed, outwardly facing surfaces 17, the purpose of which is brought out hereinafter. Bracket 16 may be used, if desired, to connect radius rods (not shown) at the lower portion 20. Bracket 16 is also provided with horizontally extending projections 22 on either side which are used to connect bracket 16 to bracket 12 as explained hereinafter.

In order to locate bracket 12 accurately on axle 10, both longitudinally and circumferentially, and maintain this location during the use of this structure, we have provided a circular recess 24 on the upper surface of axle 10, another circular recess 26 of the same diameter in the curved surface 28 of bracket 12 which rests on the axle, and a metal sphere or ball 30 which is located in the two recesses and between the abutting parts 10 and 12. The diameter of the sphere 30 is such that it fits tightly in both of the circular recesses 24 and 26, while the depth of each of these recesses is only slightly greater than one half the diameter. In addition, bracket 12 has a pair of inwardly facing confronting flat surfaces 13 which abut respectively the flat surfaces 17 on the axle. Thus, when the bracket 12 and axle 10 are pulled tightly together as illustrated in Figure 2 of the drawing the sphere is held jointly in the two recesses and there can be no movement of any kind or direction between bracket 12 and axle 10. It will be appreciated that the lower curved surface 28 of bracket 12 is shaped to conform accurately to the upper surface of axle 10 so that as long as the two surfaces are held abutting each other there can be no rotational movement about the vertical axis through the center of sphere 30.

In order to hold bracket 12 securely in place on axle 10 we have provided cap screws 32 which pass through suitable openings in portions 22 of the lower bracket and are threaded into tapped holes 34 in boss portions 35 on bracket 12. Lock washers 36 may be provided to maintain the screws 32 in position.

It will be readily appreciated that the structure described and illustrated herein is an inexpensive one but yet one which provides great accuracy. If the two circular recesses are located accurately in their respective parts and the dimensions of these recesses and of the sphere are held to close tolerances the bracket will be accurately positioned; and it will be apparent that the location and tolerances of these recesses and the sphere are easy to control accurately with present metal working techniques. Furthermore, this construction maintains the bracket 12 in the desired location indefinitely. However, should it be desired to disassemble the bracket from the axle this can be done very readily by removing cap screws 32, and the bracket can be reassembled again on the axle with equal facility.

While we have described and illustrated our invention herein as applied to a trailer axle, it will be readily appreciated that it may be used in a similar manner for attaching a bracket to the housing of a drive axle. It will be understood also that while the invention is disclosed herein in a preferred form for use with an axle composed of a cylindrical tube it is not essential that the axle be cylindrical as long as the outer surface which contains the recess is curved in arcuate, cylindrical or other similar configuration to provide for the mounting of the bracket thereon.

Thus, while we have described and illustrated herein a preferred embodiment of our invention it will be appreciated that modifications may be made, and it should be understood that we intend to cover by the appended claim all such modifications which fall within the true spirit and scope of our invention.

We claim:

The combination of an elongated tubular vehicle axle member with a transversely disposed bracket member, said tubular axle member having a curved upper surface thereon and a circular recess in the said curved upper surface, the said circular recess having a depth slightly greater than half its diameter, the said tubular axle member having an integral portion forming a pair of outwardly facing flat surfaces adjacent respectively to opposite faces of the tubular axle member, the said flat surfaces being vertically disposed and approximately parallel to a vertical plane through the longitudinal axis of the tubular axle member, said transversely disposed bracket member having a curved surface on the bottom of the central portion thereof conforming to the said curved upper surface of the said tubular axle member, the said transversely disposed bracket member having depending integral portions providing inwardly facing confronting flat surfaces adapted to abut respectively the said flat surfaces on the tubular axle member, a circular recess in the said curved surface of the bracket member having the same diameter as the said circular recess in the tubular axle member and a depth slightly greater than half its diameter, a sphere having the same diameter as said recesses, and means connected to the lower portion of said tubular axle member for holding the said bracket member and the tubular axle member in interfitting and abutting relation with each other with the said recesses in register and the said sphere occupying portions of both recesses and with the outwardly facing flat surfaces of the tubular axle member abutting the inwardly facing flat surfaces of the bracket member whereby the bracket member is accurately located on and rigidly secured to the axle member.

References Cited in the file of this patent

UNITED STATES PATENTS

| | | |
|---|---|---|
| 1,151,858 | Brock | Aug. 31, 1915 |
| 2,157,499 | Rossmann | May 9, 1939 |
| 2,175,331 | Webb | Oct. 10, 1939 |
| 2,562,256 | Benz | July 31, 1951 |